R. L. WILLIAMSON.
POWER TRANSMISSION MECHANISM.
APPLICATION FILED APR. 1, 1918.
1,347,315.
Patented July 20, 1920.
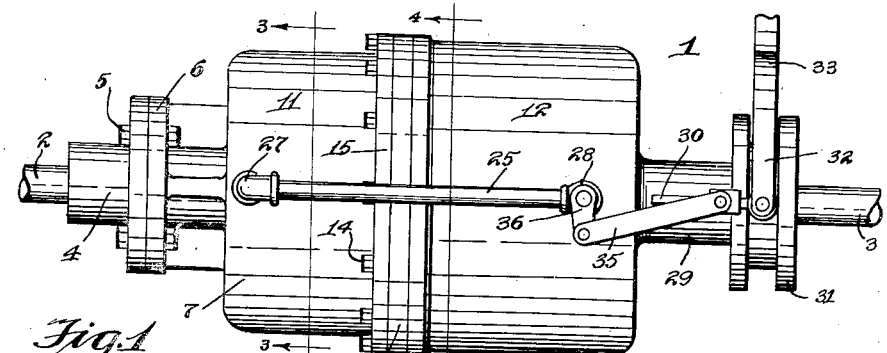
Fig. 1
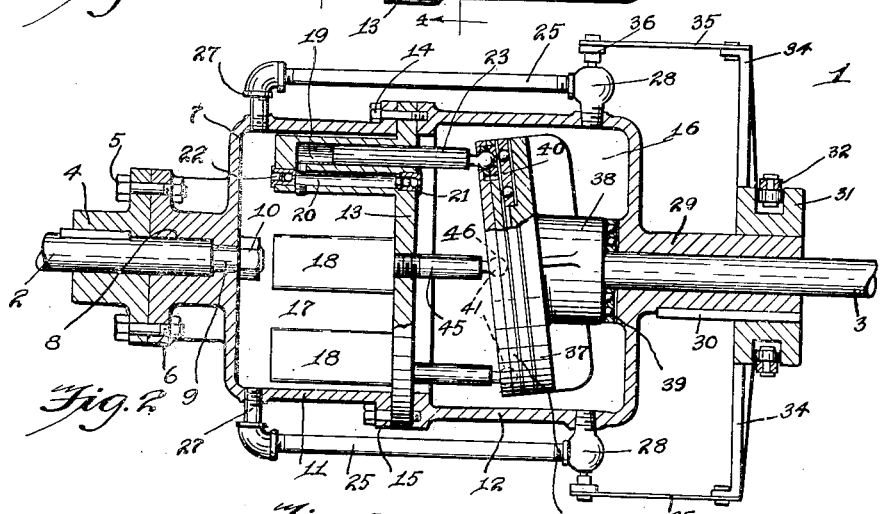
Fig. 2
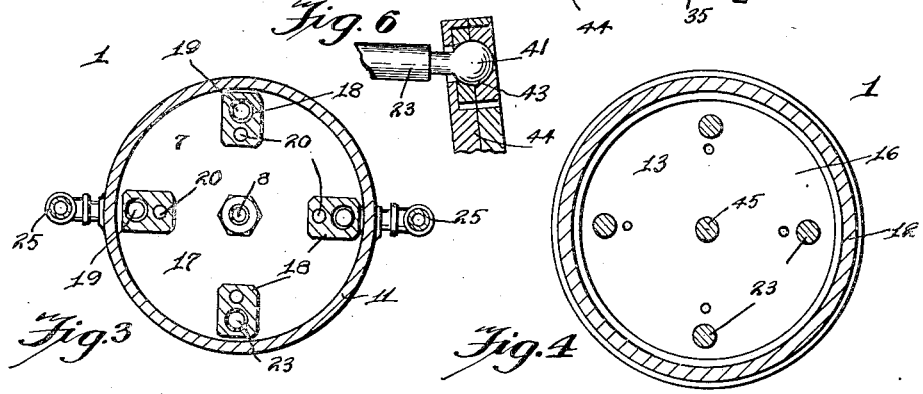
Fig. 6
Fig. 3
Fig. 4
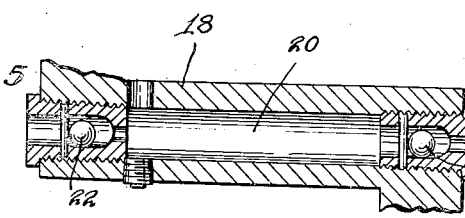
Fig. 5
Witness
A. Sundell
Inventor
R. L. Williamson
By C. C. Shepherd
Attorney

UNITED STATES PATENT OFFICE.

ROMEO L. WILLIAMSON, OF MOUNT VERNON, OHIO.

POWER-TRANSMISSION MECHANISM.

1,347,315.	Specification of Letters Patent.	Patented July 20, 1920.

Application filed April 1, 1918. Serial No. 225,870.

*To all whom it may concern:*

Be it known that I, ROMEO L. WILLIAMSON, a citizen of the United States, residing at Mount Vernon, in the county of Knox and State of Ohio, have invented certain new and useful Improvements in Power-Transmission Mechanism, of which the following is a specification.

The present invention relates to power transmission mechanism and is designed particularly to function as a variable speed transmission mechanism between a driving and a driven shaft whereby varying rates of relative rotation may exist between such shafts without the use of gears.

A somewhat similar mechanism is shown in my co-pending application Serial Number 205,010 and in the present case the mechanism claimed possesses still greater utility. In this connection, I provide a structure of casing member carried by the driving shaft and divided into high and low pressure compartments, a plurality of cylinders being operatively disposed between said compartments and arranged in an array about the driving shaft to be parallel therewith whereby the necessary amount of space may be reduced to a minimum and at the same time, the structure will be of sufficient size to serve the purpose of an ordinary flywheel should it be desired to so utilize it. In this arrangement, means forming a part of the novel combination of elements is arranged and associated with the driven shaft for coöperation with the pistons of the various cylinders to successively move them into their respective cylinders upon a relative rotative movement between shafts.

It is also an object of my invention to produce an improved type of driving head structure to be carried by the driven shaft whereby this driven shaft receives its rotary motion from the driving shaft. This novel structure comprises a part which is rigidly mounted on a driven shaft and another part which is mounted to permit relative rotation in connection with the first named part, said parts coöperating with each other at an angle other than a right angle with respect to the driven shaft whereby, under suitable resistance of the driving structure carried by the driving shaft, the driven shaft will receive its rotary motion.

With these and other objects in view as will appear as the description proceeds, the invention accordingly consists in the novel features of construction, combination of elements and arrangement of parts hereinafter fully described and having the scope thereof defined by the appended claims.

In the drawing, wherein has been shown one of the preferred embodiments of the invention:

Figure 1 is a side elevation of the improved transmission mechanism comprising the present invention.

Fig. 2 is a horizontal sectional view taken through the structure shown in Fig. 1.

Fig. 3 is the transverse sectional view taken along the line 3—3 of Fig. 1.

Fig. 4 is a similar view taken along the line 4—4 of Fig. 1.

Fig. 5 is an enlarged sectional view of the piston and cylinder structure.

Fig. 6 is a detail sectional view.

Similar characters of reference denote corresponding parts throughout all of the views of the drawing.

Referring to the details of the invention the numeral 1 designates the improved transmission mechanism comprising the present invention which, broadly speaking, is applicable as a transmission mechanism between any driving and driven shafts or their equivalents, such as in providing a variable speed transmission between the motor shaft of an automobile and the driven shaft thereof. This construction has been clearly shown in my co-pending application already referred to.

In Figs. 1 and 2 of the drawing, a driving or engine shaft 2 is illustrated together with a coöperative driven shaft 3. The driving shaft 2 is provided with a keyed coupling plate 4, which plate is bolted or otherwise secured, as shown at 5 with an enlarged end 6 integrally formed with the casing 7 of the mechanism 1. This enlarged end is provided with a stepped bore 8, which is adapted to receive the reduced end 9 of the shaft 2. A nut 10 is threaded upon the end 9 and is employed to assist in securely connecting the casing with the driving shaft, as will be clearly understood. This casing is divided into high and low pressure compartments by means of hollow members 11 and 12 between which is located a division wall 13, said members and wall being preferably secured together through the agency of concentrically situated cap screws 14, the heads of the latter engaging with an enlarged flange 15 integrally formed adjacent to the open end of the member 11. The division wall 13 divides the casing 7, into a low pressure compartment 16, which is defined by the member 12 and a high pressure compartment 17, defined by the member 11.

In this instance there are integrally formed with the wall 13 a plurality of longitudinally extending cylinders 18 arranged in a circular array about the shaft 2, which are formed to include piston receiving bores 19 and fluid passage ways 20, the latter being employed to establish fluid communication between the compartments 16 and 17. The flow of fluid through the passageway is, however, governed through the medium of ball valve structures 21 and 22, the former of which being located contiguous to the compartment 16 and the latter adjacent to the high pressure compartment. Pistons 23 are situated for reciprocation within the cylinder bores 19.

The means for effecting the reciprocation of said pistons will be described hereinafter. It will be understood, however, that when the pistons are forced outwardly, the valve structure 21 will be unseated so as to permit oil or other fluid to pass through said structures 21 into the passageways 20, and into the bores 19, further flow of the fluid being arrested by the valve structure 22. Then upon the inward movement of the pistons, the valve structure 21 will be automatically closed, so that the fluid thus confined within the passageways 20 or bores 19 will be ejected from the cylinders and into the high pressure compartment 17 by way of the valve structure 22. This action takes place when the pistons are free for reciprocation.

After being pumped into the high pressure compartment, the fluid is permitted, subject to manual control, to be returned to the low pressure compartment by way of valved pipes 25, which latter in this instance consists of pipe sections 27, communicating with the compartment 17 and leading to valves 28 situated in direct communication with the low pressure compartment 16. Thus it will be seen that when the valves 28 are open, or partially so, fluid pumped into the high pressure compartment will be returned to the low pressure compartment through the agency of the pipes 27, thus establishing fluid circulation. It will be apparent that when the valves 28 are open fluid will be readily permitted to circulate from one compartment to the other thus offering no resistance in retarding the reciprocation of the pistons 23, but, however, if the flow of fluid through said valves 28 is obstructed or greatly hindered, the pressure of said fluid within the compartments will retard or resist the reciprocating movements of the pistons 23, for a purpose to be hereinafter explained.

As before stated, the casing 7 revolves in unison with the driving shaft 2, thus in order to operate the valves 28 while the latter are in the state of rotation the following mechanism has proved to be advantageous for this purpose, although it is one of many forms which may be successfully employed. The casing member 12 is provided with an extended hub 29, which is adapted to receive the driven shaft 3, and it is provided with a spline or key 30. Adapted to reciprocate upon the hub 29 and capable of rotating uniformly therewith, through the medium of the key 30, is a sleeve 31, which is formed with an annular groove for the reception of the forked end 32 of a throw lever 33, whereby upon the oscillation of said lever, the sleeve 31 will be caused to move longitudinally of the hub 29. Integrally formed with said sleeve are a plurality of radially disposed arms 34, to the outer ends of which are pivotally connected a plurality of link members 35, which members have their opposite ends, in turn, pivotally connected with the operating arms 36 of the valves 28. From this it will be manifest that means have been provided for opening and closing the valves 28, or otherwise effecting the adjustment thereof during the rotation of the casing 7, and it is through this adjustment of the valves that the variable speeds transmitted from the shaft 2 to the shaft 3 are effected.

Keyed or otherwise secured to the inner end of the driven shaft 3 is a driving head consisting in part of a disk or plate 37, the latter including a hub portion 38 which is adapted to bear upon suitable anti-friction bearings 39, situated between the hub and the wall of the member 12. The face of this disk or plate is situated at an angle, other than a right angle, to the longitudinal axis of the driven shaft, thus the circular face of said disk member 37 will be disposed, as is clearly shown in Fig. 2, at an acute angle to the divisional wall 13. The working face of the disk 37 is, in this instance, equipped with an anti-friction bearing 40.

The outer or protruding ends of the pistons or plungers 23 are reduced and provided with ball heads 41, which are swiveled in sockets 43 formed in a disk 44, which forms another part of the driving head, this disk being adapted to be forced into coöperation with the disk 37 and the interposed bearing 40 through the agency of the fluid pressure within the casing 7, whereby upon the rotation of said casing, the disk 37 and its associated shaft 3 will be rotated in unison therewith. This disk 44 is itself mounted to pivot about the head 46 of the stud 45 threaded into the wall 13 as shown in Fig. 2.

In operation, while the valves 28 are open, or partly so, the pistons 23 will, upon the rotation of the casing 7, be successively reciprocated by the action of the disk 44 slipping over the face of the inclined plate or disk 37, so as to force the fluid from the compartment 16 to the compartment 17, and thence back to the low pressure compartment by way of the valved by passes 25. It will thus be understood that the proportionate speed of rotation of the driven shaft to the driving shaft will be regulated by the resistance offered to the reciprocation of the plungers through the action of fluid pressure. Since if the valves 28 are fully opened, the fluid pressure will offer but a minimum of resistance to the sliding movement of said pistons, thus affording but a minimum of resistance or locking coöperation between the disks 37 and 44. this action resulting in considerable slippage between the said disks so that the speed of rotation of the driving shaft will be far in excess of that of the driven shaft. However, upon closing, or upon substantially closing the valves 28, the flow of fluid from the high pressure compartment to the low pressure compartment will be substantially obstructed so that the reciprocation of the pistons 23 will be arrested by fluid pressure. This results in holding the plate or disk 44 in firm and positive locking relation with the disk 37 so that the driven shaft will be substantially locked or coupled to the driving shaft for synchronous and uniform rotation. Thus it will be understood that the variable speeds obtainable between the shafts 2 and 3 are directly controlled by the action of fluid pressure in resisting the operation of the plungers or pistons 23, which in turn governs the coöperation between the disks 37 and 44. By virtue of the inclination of the disk 37, the plungers will be successively reciprocated upon the rotation of the disk 44 over its surface, however, when the valves 28 are closed, the said disks will be substantially locked together for uniform rotation through the force exerted by liquid pressure thereon. It will be understood that the disk 44 always rotates at the same speed as the driving shaft and that any reduction in speed between the driving and driven shafts is effected by the relative movement between the disks 37 and 44 permitted by the bearing 40.

From the foregoing description, taken in connection with the accompanying drawing, it will be apparent that there is provided a transmission mechanism wherein the objects of the invention have been achieved and that all of the advantageous features of construction above mentioned are, among others, present. The mechanism is relatively simple in construction, not likely to become out of order and is capable of being readily and conveniently controlled. This invention eliminates the use of gears and the like for imparting variable speeds between a driving and a driven shaft, reduces dissipation of power usually caused by use of such gears, is substantially noiseless in operation and is capable of transferring a multitude of relative speeds between a driving and a driven shaft by virtue of a simple and conveniently operated control. The plate 44 is held in adjacent relation to the disk 37 by mounting said plate 44 upon a stud 45, which latter is threaded into the wall 13 at one end and has its other end formed with a ball shaped head 46 to permit of pivoted or rocking movement on part of said plate 44.

Having described the invention what is claimed is:

1. In a transmission mechanism of the character described, the combination with a driving and a driven shaft, of means for forming a driving connection between said shafts comprising a casing member rigidly carried by the driving shaft, said casing member being divided into high and low pressure compartments, a plurality of cylinders in said casing operatively located between said high and low pressure compartments and disposed in an array around said driving shaft to be parallel therewith, pistons movable in said cylinders, valve mechanism governing the flow of liquid through said cylinders from the low to the high pressure compartment, means for controlling the rate of flow of liquid from the high to the low pressure compartment and means associated with the driven shaft for coöperation with said pistons and arranged to sucessively move them into their respective cylinders upon a relative rotative movement between said shafts.

2. In a transmission mechanism of the character described, the combination with a driving and a driven shaft, of means for forming a driving conenction between said shafts comprising a casing member rigidly carried by the driving shaft and divided into high and low pressure liquid compartments. a plurality of cylinders interposed between said compartments, pistons movable in said cylinders, valve mechanism governing the admission to and from said cylinders, means for controlling the rate of flow of liquid from the high to the low pressure compartment, and a driving head structure on said driven shaft having a working portion set at an angle other than a right angle to said driven shaft and operatively engaging said pistons to derive its rotary motion therefrom.

3. In a transmission mechanism of the character described, the combination with a driving and a driven shaft, of means for forming a variable speed driving connection between said shafts comprising a casing member rigidly carried by one of said shafts, said casing member being divided into high and low pressure compartments, a plurality of cylinders in said casing operatively located between said high and low pressure compartments and disposed in an array around said driving shaft to be parallel therewith, pistons movable in said cylinders, valve mechanism governing the flow of liquid through said cylinders from the low to the high pressure compartment, means for controlling the rate of flow of liquid from the high to the low pressure compartment, and a driving head structure on said driven shaft having a working portion set at an angle other than a right angle to said driven shaft and bearing directly against one end of each of said pistons to derive its rotary motion therefrom.

4. In a transmission mechanism of the character described, the combination with a driving and a driven shaft, of means for forming a variable speed driving connection between said shafts comprising a casing member rigidly carried by one of said shafts, said casing member being divided into high and low pressure compartments, a plurality of cylinders in said casing operatively located between said high and low pressure compartments and disposed in an array around said driving shaft to be parallel therewith, pistons movable in said cylinders, valve mechanism governing the flow of liquid through said cylinders from the low to the high pressure compartment, means for controlling the rate of flow of liquid from the high to the low pressure compartment, and a driving head structure on said driven shaft including a part which is rigidly mounted on said driven shaft and another part which is mounted to permit relative rotation in connection with said first named part, said pistons operatively engaging said second named part to cause its rotation, said parts coöperating with each other at an angle other than a right angle with respect to the driven shaft.

5. In a transmission mechanism of the character described, the combination with a driving and a driven shaft, of means for forming a variable speed driving connection between said shafts comprising a casing member rigidly carried by one of said shafts, said casing member being divided into high and low pressure compartments, a plurality of cylinders operatively located between said high and low pressure compartments and disposed in an array around said driving shaft to be parallel therewith, pistons movable in said cylinders, valve mechanism governing the flow of liquid through said cylinders from the low to the high pressure compartment, means for controlling the rate of flow of liquid from the high to the low pressure compartment, and a driving head structure on said shaft including a part which is rigidly mounted on said driven shaft and another part coöperating therewith but mounted to permit relative rotation in connection therewith and positively connected with said piston structures to rotate in unison with said pistons, said parts coöperating with each other at an angle other than a right angle with respect to the driven shaft.

6. In a transmission mechanism of the character described, the combination with a casing divided to form high and low pressure compartments, a plurality of cylinders operatively located between said compartments, pistons movable in said cylinders, a plate operatively connected with said pistons to be rotatively driven thereby, a second plate member situated adjacent and parallel with said first named plate and located at an angle other than a right angle with respect to the longitudinal center line of rotation, and an anti-friction bearing located between said plates in connection with which both operate.

7. In a transmission mechanism of the character described, the combination with a driving and a driven shaft, of a casing member rotatable with said driving shaft and divided into high and low pressure compartments, a plurality of cylinders operatively located between said compartments and disposed in an array around said driving shaft to be parallel therewith, pistons movable in said cylinders, a stud member projecting centrally from the division wall structure of said casing, a bearing plate operatively connected with said pistons and pivotally supported from said stud for oscillatory movement, a second bearing plate carried by said driven shaft and located thereon at an angle other than a right angle with respect to the driven shaft, and an anti-friction bearing located between said plates and coöperating with both.

8. In a transmission mechanism of the character described, the combination with a casing formed to include high and low pressure compartments, a division wall structure separating said compartments, a plurality of cylinders operatively located in said wall between said compartments, pistons movable in said cylinders, a stud projecting centrally from said wall and having its outer end formed with a spherical head, a bearing plate positively engaging said pistons and swiveled upon said head, a second bearing plate rigidly carried by said driven shaft and located thereon at an angle other than a right angle with respect to the driven shaft, both plates being located within the low pressure compartment and an anti-friction bearing structure operatively located between said plates.

In testimony whereof I affix my signature.

ROMEO L. WILLIAMSON.